July 30, 1968     T. P. FOLEY ET AL     3,394,853

TIMING DISC FOR HIGH SPEED PRINTERS

Filed Oct. 10, 1966

INVENTORS
THOMAS P. FOLEY,
VITO DAUGIRDAS &
CARMINE J. ANTONUCCI

BY *Lane, Aitken, Dunner & Ziems*
ATTORNEYS 3,394,853
TIMING DISC FOR HIGH SPEED PRINTERS
Thomas P. Foley, 12 Janes Lane, Huntington, N.Y. 11743; Vito Daugirdas, 132 Thames St., Port Jefferson Station, N.Y. 11776; and Carmine J. Antonucci, 23 Village Hill Drive, Commack, N.Y. 11725
Filed Oct. 10, 1966, Ser. No. 585,575
10 Claims. (Cl. 226—9)

This invention relates to high speed printers and timing discs therefor, and more particularly to a timing disc of reduced inertia and increased resolution for controlling the paper feed of a high speed printer.

In a high speed printer the paper on which the printing is carried out is incrementally advanced line by line at a high rate. To control this incremental motion a slotted disc of low magnetic reluctance material is normally used to generate a pulse for each increment that the paper is advanced. The paper is advanced by means of a paper feed mechanism and the timing disc is usually directly coupled to this mechanism. Because the paper is advanced incrementally at a high rate, for example one thousand increments per minute, the inertia of the paper feed mechanism should be made as low as possible to permit the necessary rapid acceleration and deceleration required by the high incremental feeding rate. Because the timing disc is directly coupled to the paper feeding mechanism its inertia is part of the inertia of the paper feeding mechanism. Since the timing disc is made of low reluctance material, and because it must have an appreciable thickness at its periphery in order to generate pulses, the inertia of the timing disc is a substantial portion of the inertia of the paper feeding mechanism.

The timing disc is positioned adjacent to a magnetic transducer, which produces an output pulse each time a slot of the timing disc rotates past. If it is desired to reduce the length of each increment of paper feed, then the number of pulses produced by the timing disc per unit length of paper feed must be increased. It would seem that this result could be achieved simply by increasing the number of slots on the timing disc. However, in the timing discs of the prior art, there is a minimum practical distance between adjacent slots in the timing disc. If the distance between adjacent slots is reduced below this minimum, the resulting output signal produced by the transducer cannot be clearly separated into pulses comprising one pulse for each slot. If the distance between adjacent slots were reduced below this minimum the operation of the paper feeding mechanism, which is controlled by the pulses, would become erratic.

The number of pulses produced per unit length of paper feed can be increased using timing discs of the prior art without decreasing the distance between adjacent slots. For example, the diameter of the timing disc can be made larger, the timing disc can be operated at a higher shaft speed, or more than one timing disc can be used. However, each of these solutions to the problem adds inertia to the paper feeding mechanism and, as pointed out above, it is important to keep the inertia of the paper feeding mechanism at a minimum.

The present invention makes it possible for the timing disc to produce a greater number of output pulses per unit length of paper feed while at the same time decreasing the inertia of the timing disc. In accordance with the invention the timing disc instead of being slotted on its periphery is provided with radially extending grooves in each face of the disc. Transducers are provided on each side of the disc to produce output pulses as the grooves rotate past. The grooves in one face of the disc are staggered relative to the grooves in the opposite face. This arrangement permits the grooves to be put on the disc with a greater density than could be achieved with the slots on the periphery of the timing disc of the prior art and also substantially reduces the inertia of the timing disc since material will be taken from both sides of the disc near its periphery. The thickness of the disc is not significantly increased because the grooves are made to pass almost all the way through the disc.

In the specific embodiment of the invention the timing disc is used in combination with a paper feeding mechanism in a high speed printer. It will be understood that the principles of the invention are applicable to other systems in which high speed incremental motion is desired, such as incremental magnetic tape transports.

Accordingly, an object of the present invention is to provide an improved incremental stepping system.

Another object of the present invention is to provide an improved timing disc for controlling an incremental stepping system.

A further object of the present invention is to provide high speed printer with an improved paper feeding mechanism.

A still further object of the present invention is to provide a timing disc with reduced inertia which produces a great number of output pulses per revolution of the timing disc.

Further objects and advantages of the present invention will become readily apparent as the following detailed description of the invention unfolds and when taken in conjunction with the drawings wherein.

Figure 1:
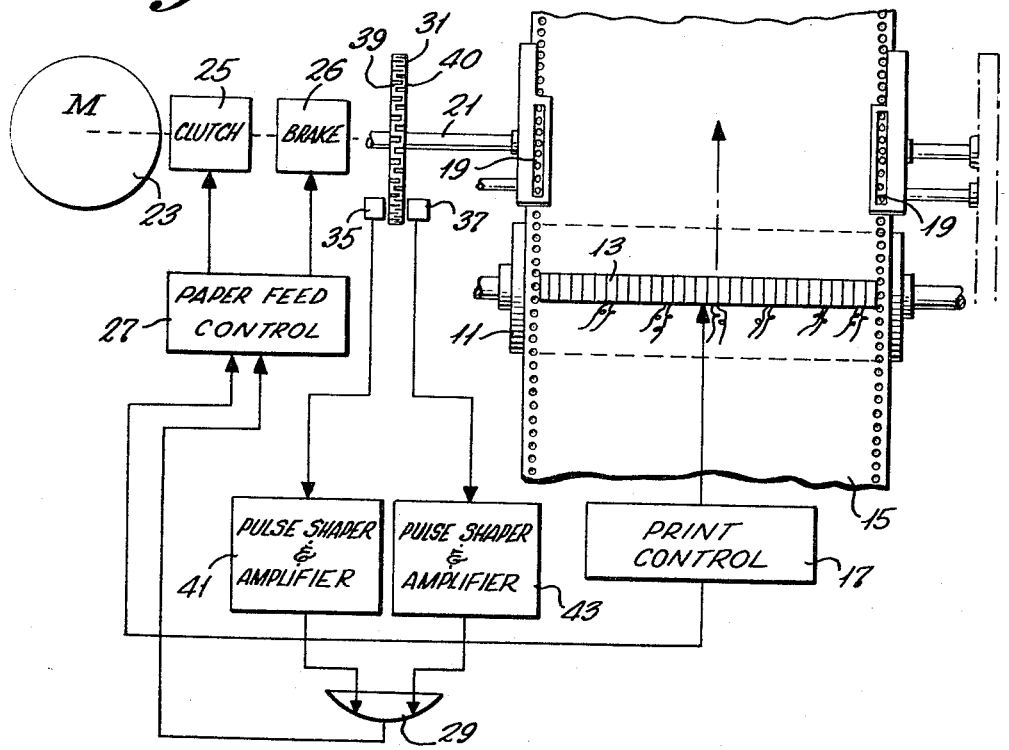
FIG. 1 is a block diagram schematically illustrating the system of the present invention.

The high speed printer incorporating the present invention is of the type disclosed in the patents to Doersam Jr. No. 3,117,514 and Wasserman No. 3,024,723. As shown in FIG. 1 the printer comprises a print drum 11 having axially extending rows of raised type angularly distributed around its periphery. All of the characters in a given axially extending row of type are the same and the different rows of type contain different characters. The drum is rotated at a high speed past a row of hammers 13 extending axially with respect to the drum. The paper on which the printing is to be carried out is designated by the reference number 15. The paper is incrementally advanced between the row of hammers and the drum. When one of the hammers 13 is fired by an applied firing pulse, it strikes the paper and an ink ribbon (not shown) against the drum 11 to cause the character underneath the hammer at that instant to be printed in the space beneath the hammer. By controlling the timing of the firing of the hammer relative to the instantaneous angular position of the drum, any character on the drum can be printed under the hammer. Thus, any desired line of characters can be printed in the line of the paper under the row of hammers 13. When a row of characters has been printed, the paper is advanced one line so that the hammers can be selectively fired to print another row of characters. In this manner the printer prints out at a high speed. The application of firing pulses to the hammers 13 to print the desired information is controlled by print control 17.

The paper 15 is incrementally advanced in a conventional manner by tractors 19, which comprise belts driven between two pulleys with prongs on each belt to engage in holes on each side of the paper 15. The tractors 19 are driven by a common shaft 21 which is directly coupled to one of the pulleys of each of the two tractors 19. The shaft 21 is incrementally driven by a continuously rotating motor 23, which is intermittely connected to the shaft 21 by means of a clutch 25. When the paper 15 is to be advanced one increment, the paper feed control 27 disengages a brake 26 acting on the shaft 21 and engages the clutch 25 to cause the shaft 21 to start to rotate. When the paper has advanced the desired increment, the clutch will be disengaged and the brake will be engaged to stop the shaft 21 and thus stop the paper 15 so that the next line on the paper 15 can be printed. When the desired characters have been printed on a line of the paper 15, the print control 17 will apply a signal to the paper feed control 27 to cause the paper feed control 27 to disengage the brake and engage the clutch. When the paper has been advanced one increment, or in other words has been advanced one print line, the paper feed control 27 will receive a pulse from an OR gate 29. In response to this pulse paper feed control will disengage the clutch 25 and engage the brake 26 thus bringing the shaft 21 and the paper 15 to a stop.

Figure 2:
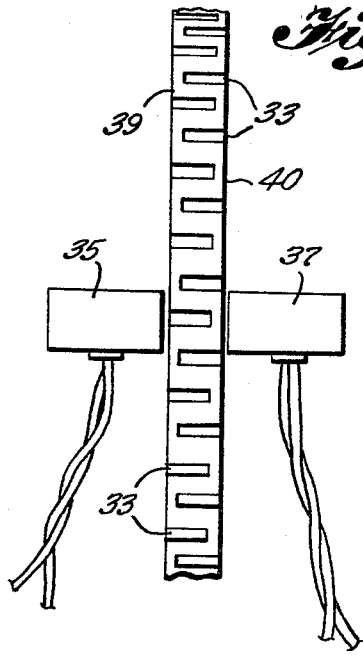
FIG. 2 is an enlarged peripheral view of the timing disc of the present invention and the transducers coacting therewith.
Figure 3:
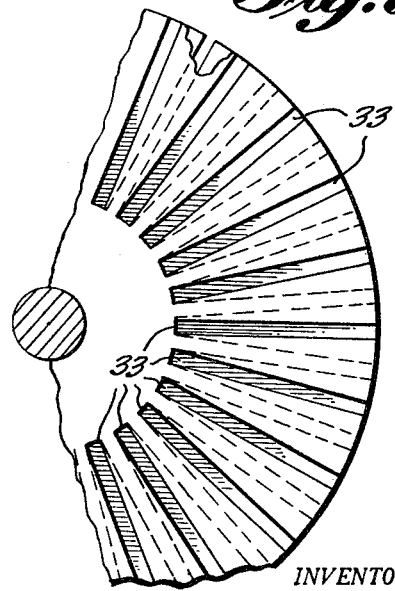
FIG. 3 is an enlarged view illustrating one side of the timing disc of the present invention.

The pulses applied to the paper feed control 27 from the OR gate 29 are generated by means of a timing disc 31, which is mounted on the shaft 21, to rotate therewith. The timing disc 31 comprises low magnetic reluctance material and, as best illustrated in the enlarged views of FIGS. 2 and 3, has defined in each face radially extending grooves 33, which are angularly distributed about the timing disc axis. The grooves on one face of the disc are staggered relative to the grooves on the other face of the disc thus permitting the grooves to extend more than half way through the disc. In the preferred embodiment the grooves extend approximately ⅘ of the way through the disc as is illustrated in FIG. 2. Magnetic transducers 35 and 37 are positioned adjacent opposite faces of the disc 31 near the periphery thereof. Each time a groove on one face 39 of the timing disc 31 passes by the transducer 35, the transducer 35 will produce an output pulse. Each time a groove on the opposite face 40 passes by the transducer 37, the transducer 37 will produce an output pulse. The transducers 35 and 37 are positioned so that the angular distance that the disc 31 travels from a position at which a pulse is produced by the transducer 35 to the next position at which a pulse is produced by the transducer 37 is equal to the angular distance that the disc travels from a position at which a pulse is produced by the transducer 37 to the next position at which a pulse is produced by the transducer 35. It will be noted that this result is achieved if both transducers 35 and 37 are located at the same angular position about the axis of the disc 31. The pulses produced by the transducer 35 are applied to a pulse shaper and amplifier 41, which shapes and amplifies the applied pulses, and applies them to the OR gate 29. The pulses produced by the transducer 37 are applied to a pulse shaper and amplifier 43, which shapes and amplifies the applied pulses and applies them to the OR gate 29. The alternately occurring pulses produced by the transducers 35 and 37 are then combined onto a single channel by the OR gate 29 and applied to the paper feed control 27.

As pointed out above each time the OR gate 29 applies a pulse to the paper feed control 27, the paper feed control 27 will disengage the clutch 25 and engage the brake 26 and bring the shaft 21 and the paper 15 to a stop. Thus, each time a groove on the face 39 of the timing disc passes by the transducer 35 or a groove on the face 40 of the timing disc passes by the transducer 37, the paper will be stopped. In this manner the paper is fed in increments corresponding to the distance between adjacent grooves on opposite sides of the timing disc. Because the grooves are on the opposite sides of the timing disc instead of being on the same side, or in the periphery of the timing disc, the minimum distance between adjacent grooves can be reduced to half of that possible with the slots in the timing discs of the prior art. This increased density is achieved because the transducer 35 is not significantly affected by grooves in the face 40 of the timing disc and the transducer 37 is not significantly affected by grooves in the face 39 of the timing disc. Thus the grooves in the face 40 of the timing disc can be placed the minimum distance apart and the grooves on the face 39 of the timing disc can also be placed the minimum distance apart with the result that adjacent grooves on opposite sides of the disc are one half this minimum distance. Because more grooves are provided in the disc 31 than was heretofore practical, the inertia of the disc is reduced. Thus the present invention permits the paper to be fed with smaller increments while at the same time reduces the inertia of the timing disc.

The specific embodiment of the present invention that has been described is a high speed printer of the drum type. It will be evident that the invention is equally applicable to high speed printers of the chain type. Moreover, as pointed out above, the principles of the present invention are applicable to other similar type incremental stepping systems which must be operated at a high stepping rate. The invention is particularly applicable to incremental stepping systems in which the member to be incrementally advanced is a web such as the paper in a high speed printer or the magnetic tape in an incremental tape transport.

The above description is of a preferred embodiment of the invention and many modifications may be made thereto without departing from the spirit and scope of the invention which is defined in appended claims.

What is claimed is:

1. A timing disc having a plurality of radially extending grooves defined in each face of the disc distributed about the axis of the disc, the grooves in one face of the disc being staggered relative to the grooves in the other face, the portion of said disc in which said grooves are formed comprising low magnetic reluctance material.

2. A timing disc as recited in claim 1 wherein the depth of the grooves formed in each face of the disc are more than one half the thickness of the disc.

3. A timing control system comprising a timing disc as recited in claim 1, means mounting said disc for rotation on its axis, a magnetic transducer position adjacent one face of said disc in transducing relationship with the grooves defined in such face, and a second magnetic transducer positioned adjacent the opposite face of said disc in transducing relationship with the grooves defined in the opposite face of said disc.

4. A timing control system as recited in claim 3 wherein the depth of said grooves formed in said disc is more than half the thickness of said disc.

5. An incremental drive system comprising a drive shaft, a timing disc coupled to said shaft having a plurality of radially extending grooves defined in each face of said disc distributed about the axis of said disc, the grooves in one face of said disc being staggered relative to the grooves in the opposite face, magnetic transducing means to produce an output pulse when each groove in said disc rotates past a transducing station, and means responsive to the output pulses produced by said transducing means to drive said drive shaft incrementally, rotating said drive shaft one increment for each output pulse from said transducing means.

6. An incremental drive system as recited in claim 5 wherein said transducing means comprises a first magnetic transducer adjacent one face of said disc in transducing relationship with the grooves formed in such face and a second magnetic transducer adjacent the opposite face of said disc in transducing relationship with the grooves defined in the opposite face of said disc.

7. An incremental drive system as recited in claim 5 wherein a web advancing means is coupled to said drive shaft to translate the incremental rotation of said drive shaft into the incremental advancement of a web.

8. An incremental drive system as recited in claim 7 wherein said transducing means comprises a first magnetic transducer adjacent one face of said disc in transducing relationship with the grooves formed in such face and a second magnetic transducer adjacent the opposite face of said disc in transducing relationship with the grooves defined in the opposite face of said disc.

9. A paper drive system for high speed printer comprising paper advancing means having an input shaft and operable to translate the rotation of said input shaft into the advancement of paper to be printed on by said high speed printer, a timing disc coupled to said input shaft having radially extending grooves on each face thereof distributed about the axis of said disc, the grooves of one face of said disc being staggered relative to the grooves on the opposite face of said disc, transducing means to produce an output pulse each time a groove on said disc passes by a transducing station, and means responsive to the output pulses of said transducing means to drive said input shaft incrementally, rotating said input shaft one increment for each output pulse of said transducing means.

10. A paper drive system for high speed printer as recited in claim 9 wherein said transducing means comprises a first magnetic transducer adjacent one face of said disc in transducing relationship with the grooves formed on said one face of said disc and a second magnetic transducer adjacent the opposite face of said disc in transducing relationship with the grooves formed in said opposite face of said disc.

References Cited

UNITED STATES PATENTS

| | | | |
|---|---|---|---|
| 3,070,800 | 12/1962 | Brown | 340—174.1 |
| 3,275,208 | 9/1966 | Poumakis | 226—9 |
| 3,283,702 | 11/1966 | Higgins | 101—93 |

M. HENSON WOOD, JR., *Primary Examiner.*

R. A. SCHACHER, *Assistant Examiner.*